(12) United States Patent
Morisaki

(10) Patent No.: US 9,849,870 B2
(45) Date of Patent: Dec. 26, 2017

(54) HYBRID VEHICLE HAVING SWITCH CONTROL FUNCTION OF TRAVEL MODE BASED ON MAP INFORMATION

(71) Applicant: TOYOTA JIDOSHA KABUSHIKI KAISHA, Toyota-shi, Aichi-ken (JP)

(72) Inventor: Keisuke Morisaki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 26 days.

(21) Appl. No.: 14/901,107

(22) PCT Filed: Jul. 11, 2013

(86) PCT No.: PCT/JP2013/069034
§ 371 (c)(1),
(2) Date: Dec. 28, 2015

(87) PCT Pub. No.: WO2015/004782
PCT Pub. Date: Jan. 15, 2015

(65) Prior Publication Data
US 2016/0137185 A1   May 19, 2016

(51) Int. Cl.
*B60W 20/12* (2016.01)
*B60K 6/445* (2007.10)
(Continued)

(52) U.S. Cl.
CPC ............. *B60W 20/12* (2016.01); *B60K 6/442* (2013.01); *B60K 6/445* (2013.01); *B60L 3/12* (2013.01); *B60L 7/10* (2013.01); *B60L 11/123* (2013.01); *B60L 11/14* (2013.01); *B60L 11/1862* (2013.01); *B60L 11/1872* (2013.01); *B60L 15/2045* (2013.01); *B60W 10/08* (2013.01); *B60W 10/26* (2013.01);
(Continued)

(58) Field of Classification Search
USPC .......... 701/22, 118, 123, 465; 903/903, 947; 180/65.265, 65.27
See application file for complete search history.

(56) References Cited

U.S. PATENT DOCUMENTS

2008/0262668 A1   10/2008 Yamada
2010/0087978 A1*   4/2010 Fleckner .................. B60L 11/12
701/22
(Continued)

FOREIGN PATENT DOCUMENTS

JP   09-093717   4/1997
JP   2007-097359   4/2007
(Continued)

*Primary Examiner* — Richard Goldman
(74) *Attorney, Agent, or Firm* — Finnegan, Henderson, Farabow, Garrett & Dunner, LLP

(57) ABSTRACT

This hybrid vehicle (10) has an HV mode and an EV mode, creates a predetermined traveling plan in a manner so as to switch between HV mode and EV mode on the basis of map information, and performs mode switching control on the basis of the traveling plan. The hybrid vehicle (10) limits the execution of mode switching control that is on the basis of the traveling plan in the case of a predetermined state such that the power that can be output by a battery (28) that is the storage battery connected to a second MG (24) that is a rotary electric machine driven during execution of the EV mode is limited.

7 Claims, 10 Drawing Sheets

| | | PLANNED SWITCHING CONTROL | |
|---|---|---|---|
| | | BEFORE START | DURING EXECUTION |
| BAT-TERY | BATTERY TEMPERATURE (LOW TEMPERATURE OR HIGH TEMPERATURE AT WHICH EV MODE CANNOT BE EXECUTED) | DO NOT START | INTERRUPT |
| STA-TE | BATTERY POSSIBLE POWER Wout (POWER AT WHICH EV MODE CANNOT BE EXECUTED) | DO NOT START | INTERRUPT |
| | BATTERY SOC (LOW SOC AT WHICH EV MODE CANNOT BE EXECUTED) | DO NOT START | SUSPEND AFTER TRANSITION TO HV MODE |
| SWI-TCH | ONE OF FOLLOWING IS ON: A: EV-HV SWITCHING SW B: EV URBAN AREA SW C: SOC RECOVERY SW | DO NOT START | INTERRUPT |
| MODE | TRANSITION TO HV MODE WITHOUT PLANNED SWITCHING CONTROL | DO NOT START | — |
| OTH-ERS | DETECTION OF FAILURE OF VEHICLE | DO NOT START | SUSPEND |

(51) Int. Cl.

| | | |
|---|---|---|
| *B60L 11/14* | (2006.01) | |
| *B60W 10/08* | (2006.01) | |
| *B60W 10/26* | (2006.01) | |
| *B60L 3/12* | (2006.01) | |
| *B60L 11/12* | (2006.01) | |
| *B60L 11/18* | (2006.01) | |
| *B60L 15/20* | (2006.01) | |
| *B60K 6/442* | (2007.10) | |
| *B60L 7/10* | (2006.01) | |
| *B60W 20/14* | (2016.01) | |

(52) U.S. Cl.
CPC ... *B60L 2240/545* (2013.01); *B60L 2240/622* (2013.01); *B60L 2260/26* (2013.01); *B60L 2260/54* (2013.01); *B60W 20/14* (2016.01); *B60W 2550/402* (2013.01); *B60W 2710/18* (2013.01); *B60Y 2300/182* (2013.01); *Y02T 10/6217* (2013.01); *Y02T 10/6239* (2013.01); *Y02T 10/645* (2013.01); *Y02T 10/705* (2013.01); *Y02T 10/7005* (2013.01); *Y02T 10/7044* (2013.01); *Y02T 10/7077* (2013.01); *Y02T 10/7283* (2013.01); *Y02T 10/7291* (2013.01); *Y02T 90/16* (2013.01); *Y02T 90/162* (2013.01); *Y10S 903/93* (2013.01)

(56) References Cited

U.S. PATENT DOCUMENTS

| | | | | |
|---|---|---|---|---|
| 2010/0324765 | A1* | 12/2010 | Iida | H01M 10/486 |
| | | | | 701/22 |
| 2011/0066308 | A1* | 3/2011 | Yang | B60W 20/12 |
| | | | | 701/22 |
| 2013/0179007 | A1* | 7/2013 | Dalum | H01M 16/006 |
| | | | | 701/2 |
| 2014/0088810 | A1* | 3/2014 | Gehring | B60W 10/06 |
| | | | | 701/22 |
| 2014/0142797 | A1 | 5/2014 | Otake | |
| 2015/0006001 | A1* | 1/2015 | Kawata | B60K 6/48 |
| | | | | 701/22 |
| 2015/0019060 | A1* | 1/2015 | Suzuki | B60W 10/26 |
| | | | | 701/22 |
| 2015/0073637 | A1* | 3/2015 | Lennevi | B60W 20/14 |
| | | | | 701/22 |
| 2015/0134174 | A1* | 5/2015 | Preece | H01M 10/44 |
| | | | | 701/22 |
| 2015/0239365 | A1* | 8/2015 | Hyde | B60L 11/1861 |
| | | | | 701/2 |
| 2015/0274021 | A1* | 10/2015 | Sato | B60L 3/003 |
| | | | | 701/22 |
| 2015/0274028 | A1* | 10/2015 | Payne | B60L 11/1861 |
| | | | | 701/22 |
| 2015/0275787 | A1* | 10/2015 | Dufford | F02D 29/02 |
| | | | | 701/102 |
| 2015/0276420 | A1* | 10/2015 | McGee | B60W 20/12 |
| | | | | 701/118 |
| 2015/0291145 | A1* | 10/2015 | Yu | B60W 10/06 |
| | | | | 701/22 |
| 2015/0298680 | A1* | 10/2015 | Matthews | B60W 20/00 |
| | | | | 701/22 |
| 2015/0336458 | A1* | 11/2015 | Lee | B60L 15/2009 |
| | | | | 701/70 |
| 2016/0052420 | A1* | 2/2016 | Kim | B60L 11/1862 |
| | | | | 701/22 |
| 2016/0137185 | A1* | 5/2016 | Morisaki | B60L 7/10 |
| | | | | 701/22 |
| 2016/0146118 | A1* | 5/2016 | Wichmann | F02C 9/50 |
| | | | | 701/100 |
| 2016/0167642 | A1* | 6/2016 | Debert | B60W 50/0097 |
| | | | | 701/22 |
| 2016/0176309 | A1* | 6/2016 | Jeon | G01C 21/3469 |
| | | | | 701/22 |
| 2016/0202074 | A1* | 7/2016 | Woodard | G06Q 10/047 |
| | | | | 701/465 |

FOREIGN PATENT DOCUMENTS

| | | |
|---|---|---|
| JP | 2008-265594 | 11/2008 |
| JP | 2009-220788 | 10/2009 |
| JP | 2010-241396 | 10/2010 |
| JP | 2013-052798 | 3/2013 |
| WO | WO 2013/018198 A1 | 2/2013 |

* cited by examiner

| | | PLANNED SWITCHING CONTROL | |
|---|---|---|---|
| | | BEFORE START | DURING EXECUTION |
| BAT-TERY STA-TE | BATTERY TEMPERATURE (LOW TEMPERATURE OR HIGH TEMPERATURE AT WHICH EV MODE CANNOT BE EXECUTED) | DO NOT START | INTERRUPT |
| | BATTERY POSSIBLE POWER Wout (POWER AT WHICH EV MODE CANNOT BE EXECUTED) | DO NOT START | INTERRUPT |
| | BATTERY SOC (LOW SOC AT WHICH EV MODE CANNOT BE EXECUTED) | DO NOT START | SUSPEND AFTER TRANSITION TO HV MODE |
| SWI-TCH | ONE OF FOLLOWING IS ON: A: EV-HV SWITCHING SW B: EV URBAN AREA SW C: SOC RECOVERY SW | DO NOT START | INTERRUPT |
| MODE | TRANSITION TO HV MODE WITHOUT PLANNED SWITCHING CONTROL | DO NOT START | — |
| OTH-ERS | DETECTION OF FAILURE OF VEHICLE | DO NOT START | SUSPEND |

FIG. 3

HYBRID VEHICLE HAVING SWITCH CONTROL FUNCTION OF TRAVEL MODE BASED ON MAP INFORMATION

CROSS-REFERENCE TO RELATED APPLICATIONS

This application is a national phase application of International Application No. PCT/JP2013/069034, filed Jul. 11, 2013, the content of all of which is incorporated herein by reference.

TECHNICAL FIELD

The present invention relates to a hybrid electric vehicle which has an HV mode and an EV mode, and which produces a predetermined travel plan and executes a switching control of modes, to switch between the HV mode and the EV mode based on acquired map information.

BACKGROUND ART

In the related art, there is known a hybrid electric vehicle which travels with at least, one of an engine and a traveling motor which is a rotary electric machine as a drive source, wherein the hybrid electric vehicle travels by switching between an HV mode and EV mode during travel. The "HV mode" is a travel mode in which execution and non-execution of driving of the engine and the traveling motor, charging of an electricity storage unit by a power generator driven by the engine, and regenerative charging by the traveling motor are switched to maintain a current SOC at a reference SOC. The "EV mode" is a travel mode in which the vehicle is basically driven using the traveling motor, among the engine and the traveling motor, and no charging of the electricity storage unit by the power generator is executed.

Patent Document 1 discloses a hybrid electric vehicle which travels while switching between the HV mode and the EV mode, wherein a navigation control device executes an SOC management plan process using map data. In this process, an amount of electric power consumption of the electricity storage unit when the vehicle travels in the EV mode in a continuous section going back from a destination along a travel route toward an origin, and a travel starting point is determined when the vehicle travels in the EV mode such that a remaining amount of charge of the electricity storage unit becomes a predetermined value at the destination.

RELATED ART REFERENCE

Patent Document

[Patent Document 1] JP 2008-265594 A

DISCLOSURE OF INVENTION

Technical Problem

In a hybrid electric vehicle, if a predetermined travel plan is produced to switch between the HV mode and the EV mode based on map information, and the switching control of the modes is executed based on the plan, there is a possibility that the vehicle efficiency will be improved. However, depending on the state of the electricity storage unit, there may be cases where it is not appropriate to execute the switching of the modes based on the plan. For example, there may be a case where starting and stopping of the engine are frequently repeated, resulting in uncomfortable feeling to the driver, in degradation of the fuel consumption, and in early degradation of the electricity storage unit. Because of such circumstances, a switching control of the modes which is more appropriate is desired. Patent Document 1 does not disclose a means for solving such a problem.

An advantage of the present invention is in the provision of a hybrid electric vehicle in which drivability, fuel consumption performance, and endurance of the electricity storage unit can be improved.

Solution to Problem

According to one aspect of the present invention, there is provided a hybrid electric vehicle that has an HV mode and an EV mode, that produces a predetermined travel plan to switch between the HV mode and the EV mode based on map information, and that executes switching control of modes based on the travel plan, wherein execution of the switching control of the modes based on the travel plan is limited when in a predetermined state in which electric power that can be output from the electricity storage unit connected to a rotary electric machine driven during execution of the EV mode is limited.

Advantageous Effect

According to the hybrid electric vehicle of various aspects of the present invention, the execution of the switching control based on the travel plan can be limited when inappropriate, and thus, the drivability, fuel consumption performance, and endurance of the electricity storage unit can be improved by suppressing repetitive starting and stopping of the engine.

BRIEF DESCRIPTION OF DRAWINGS

FIG. 3 is a diagram showing an example case where the planned switching control is limited in the vehicle of FIG. 1.

EMBODIMENT

Figure 1:
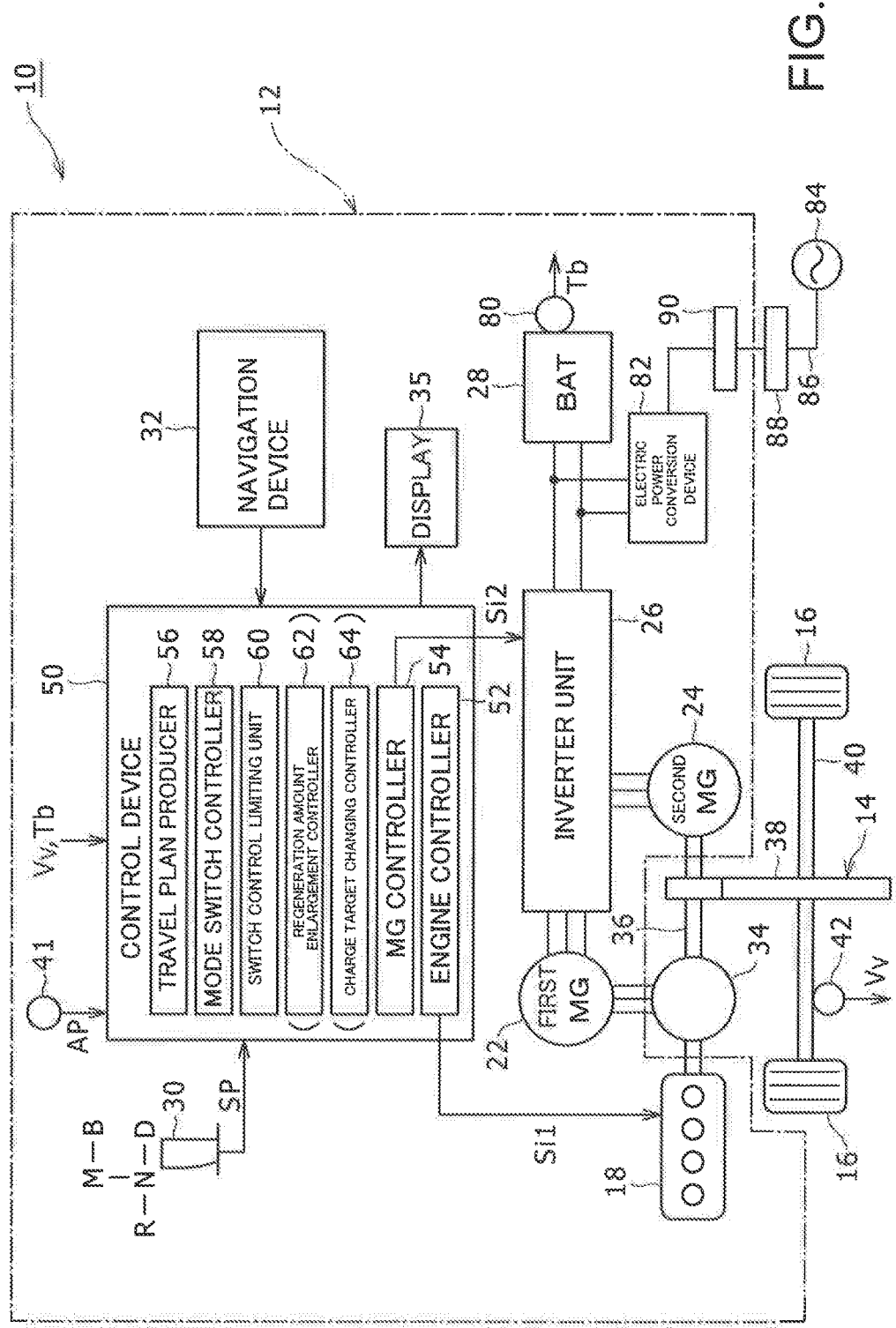
FIG. 1 is a structural diagram of a hybrid electric vehicle according to a preferred embodiment of the present invention.

A preferred embodiment of the present invention will now be described with reference to the drawings. In the following description, a case is described in which a hybrid electric vehicle according to the present invention has a structure including motor generator which has function of an electric motor and a generator as an rotary electric machine, but alternatively, a structure simply having a function of the electric motor may be used as the rotary electric machine. In addition, in the following description, a plug-in hybrid electric vehicle having a charging function from an eternal power supply will be described, but alternatively, the hybrid electric vehicle may be of a type which does not have the charging function of the plug-in type. In the following description, similar elements over multiple drawings are assigned the same reference numerals for explanation.

FIG. 1 schematically shows a structure of a hybrid electric vehicle 10 equipped, with a control system 12 according to a preferred embodiment of the present invention. The control system 12 comprises an engine 18, a first motor generator 22 and a second motor generator 24, an inverter unit 26, a battery 28 which is an electricity storage unit, a transmission lever 30, a navigation device 32, a display 35, and a control device 50.

The hybrid electric vehicle 10 travels by driving a wheel 16 using at least one of the engine 18 and the second motor generator 24 as a drive source. In the following, the first motor generator 22 will be described as "first MG 22", and the second motor generator 24 will be described as "second MG 24".

The engine 18 is a gasoline engine or a diesel engine. The engine 18 is controlled by a control signal Si1 from the control device 50.

The first MG 22 is a three-phase synchronous rotary electric machine, and primarily has a function of a power generator which is driven by the engine 18 and which generates electric power. In a power generation state of the first MG 22, at least a part of torque from the engine 18 is transmitted via a motive power dividing mechanism 34 (to be described later) to a rotational shaft of the first MG 22. The generated electric power of the first MG 22 is supplied via the inverter unit 26 to the battery 28, and the battery 28 is charged.

The first MG 22 also has a function of an engine starting motor which is supplied with electric power from the battery 28 and is driven, to start the engine 18 via the motive power dividing mechanism 34.

The second MG 24 is a three-phase synchronous rotary electric machine, and is driven daring execution of an EV mode (to be described later). The second MG 24 has a function of a motor which is supplied with electric power from the battery 28, and is driven to generate a driving force of the vehicle. The second MG 24 also has a function of a power generator for electric power regeneration during braking. The generated electric power of the second MG 24 is also supplied via the inverter unit 26 to the battery 28, and the battery 28 is charged. Alternatively, as the first MG 22 and the second MG 24, an induction rotary electric machine or other types of rotary electric machines may be used.

The motive power transmission mechanism 14 comprises the motive power dividing mechanism 34, an output shaft 36 connected to the motive power dividing mechanism 34, a gear-reducer 38 connected to the output shaft 36, and an axle 40. The motive power dividing mechanism 34 is formed from a planetary gear mechanism. The planetary gear mechanism includes a sun gear, a pinion gear, a carrier, and a ring gear. For example, the sun gear is connected to an end of the hollow rotational shaft of the first MG 22. The carrier is connected to a drive shaft of the engine 18. The ring gear is connected to the output shaft 36, and the output shaft 36 is connected to a rotational shaft of the second MG 24 directly or via a gear reducer (not shown). The output shaft 36 is connected to the axle 40 which is connected to the wheel 16 via the gear-reducer 38. The motive power dividing mechanism 34 divides the motive power from the engine 18 into a route to the output shaft 36 and a route to the first MG 22.

The inverter unit 26 is connected between the first and second MGs 22 and 24 and the battery 28. The inverter unit 26 includes a first inverter (not shown) connected between the first MG 22 and the battery 28, and a second inverter (not shown) connected between the second MG 24 and the battery 28, and is controlled by a control signal Si2 from the control device 50.

The first inverter converts a DC voltage supplied from the battery 28 into an AC voltage and supplies the converted voltage to the first MG 22, and drives the first MG 22. The first inverter also has a function to convert, when the first MG 22 generates power with the driving of the engine 18, the AC voltage obtained by the power generation into a DC voltage, and to supply the converted DC voltage to the battery 28.

Similarly, the second inverter converts the DC voltage from the battery 28 into an AC voltage and supplies the converted voltage to the second MG 24, and drives the second MG 24. The second inverter also has a function to convert, during regenerative braking of the hybrid electric vehicle 10, the AC voltage regeneratively generated by the second MG 24 into a DC voltage, and to supply the converted DC voltage to the battery 28. Operations of the inverters are controlled by the control signal Si2. In this case, the control device 50 to be described later controls the regenerative torque of the second MG 24 so that the second MG 24 regeneratively generates power, and the regenerative braking force is generated on the wheel 16. The regenerative generation of the second MG 24 may be executed when an acceleration pedal to be described later enters a non-operation state during travel. Alternatively, a DC-to-DC converter which boosts the voltage of the battery 28 and outputs the boosted voltage to the inverters or which reduces the voltage supplied from the inverters and supplies the reduced voltage to the battery 28 may be connected between the first and second inverters and the battery 28.

The battery 28 is formed from a nickel-metal hydride battery or a lithium ion battery, and is connected to the first MG 22 and the second MG 24 via the first inverter or the second inverter. Electric power can be supplied from the battery 28 to the first MG 22 and the second MG 24 via the inverters. On a positive electrode side of the battery 28, a battery current sensor (not shown) is attached, which detects a charging/discharging current, and transmits a detected value thereof to the control device 50. The control device 50 calculates an SOC (State Of Charge) which is a remaining amount of charge of the battery 28, from an accumulated value of the charging/discharging current.

The SOC may be calculated from a detected value of a voltage sensor which detects a voltage of the battery 28, and a detected value of the battery current sensor. Alternatively, a capacitor may be used as the electricity storage unit.

A temperature sensor 80 detects the temperature Tb of the battery, and a signal representing the detected value thereof is transmitted to the control device.

An electric power conversion device 82 has a function to convert AC power from an external power supply 84 into DC power, to output the DC power to the battery 28, and to charge the battery 28. The electric power conversion device 82 is controlled by a control signal from the control device 50. In this case, in a stopped state of the vehicle, when a connector 88 provided on a cable 86 connected to the external power supply 84 is connected to a connector 90 connected to the electric power conversion device 82, charging from the external power supply 84 to the battery 28 is enabled.

An acceleration position sensor 41 detects an acceleration position AP which determines an amount of operation of the acceleration pedal, and a signal representing the acceleration position AP is transmitted to the control device 50.

A wheel speed sensor 42 detects a number of rotations Vv per unit time of the wheel 16, and a signal representing the number of rotations Vv is transmitted to the control device 50. The control device 50 calculates a vehicle speed Vc based on the number of rotations Vv. Alternatively, the control device 50 may calculate the vehicle speed Vc based on a detected value of a second rotation sensor (not shown) which detects a number of rotations of the second MG 24.

The transmission lever 30 can be switched to one of an R position, an N positron, a D position, an M position, and a B position, by an operation. The position of the transmission lever 30 is detected by a position sensor (not shown), and a signal representing the detected position is transmitted to the control device 50. The D position corresponds to a D range mode which is a standard forward travel mode.

The navigation device 32 assists traveling of the hybrid route from a current position to the destination and a duration until arrival. The navigation device 32 acquires the current position from a GPS sensor (not shown). The navigation device 32 stores map information including road information such as inclination information of the road and the speed limit, intersection position information, signal light position information, and temporary stop position information, and matches the current position with the map information to identify the current position on the map. The navigation device 32 acquires destination information by an operation of the user, and calculates a travel route to the destination and the duration until arrival at the destination. The navigation device 32 acquires an orientation of the hybrid electric vehicle 10 from an orientation sensor (not shown).

In addition, the navigation device 32 can set, when any one of an intersection, a signal light, and a temporary stop position exists nearby in front of the vehicle in the direction of travel of the vehicle on the travel route, a stop position or a temporary stop position immediately before the intersection or the signal light as a target stop position of the vehicle 10. The navigation device 32 may acquire infrastructure information including red light information of the signal light, and set, when the signal light in front of the vehicle is a red light, a stop position immediately before the signal light as the target stop position. For example, the infrastructure information may be received from an external transmission facility by radio waves. The navigation device 32 transmits a signal representing information including the current position and the target stop position to the control device 50 by a CAN transmission line.

The display 35 is a display, and has a function to notify the driver of execution or non-execution of a planned switching control based on the map information, to be described later. The display 35 may have a function to display information including the velocity of the vehicle 10.

The control device 50 is called an ECU, and includes a microcomputer including a CPU and a storage unit having a memory. In the example configuration shown in the drawings, the control device 50 is shown as one control device, but alternatively, the control device 50 may have a structure in which the device is divided into a plurality of constituent elements as appropriate, and the constituent elements are connected to each other by signal cables. The control device 50 comprises an engine controller 52 which controls the engine 18, an MG controller 54 which controls the first MG 22 and the second MG 24, a travel plan producer 56, a mode switch controller 58, and a switch control limiting unit 60. The travel plan producer 56, the mode switch controller 58, and the switch control limiting unit 60 will be described later.

The engine controller 52 generates the control signal Si1 to be output to the engine 18, and the MG controller 54 generates the control signal Si2 to be output to the inverter unit 26. When a DC-to-DC converter is used, operations of the DC-to-DC converter are also controlled by the control signal Si2.

The control device 50 controls driving of the engine 18, the first MG 22, and the second MG 24 according to a travel requested power Preq based on the operation of the acceleration pedal as the operation of the driver. Specifically, the control device 50 calculates a travel requested torque Tr* requested for traveling according to a map or a relationship equation stored in the storage unit in advance, and based on the acceleration position AP and the vehicle speed Vc. The travel requested torque Tr* is a torque which is output to the output shaft 36. The control device 50 calculates the travel requested power Preq from the travel requested torque Tr* and the number of rotations of the second MG 24 itself, or the number of rotations per unit time of the output shaft 36 which is a number of rotations calculated from the number of rotations of the second MG 24. The control device 50 controls driving of the engine 18, the first MG 22, and the second MG 24 so that the travel requested power Preq is output to the output shaft 36.

The control device 50 calculates, as a target engine power Pe*, a power in which a charge/discharge requested electric power for setting the SOC of the battery 28 closer to the reference SOC is added to the travel requested power Preq, and calculates a target number of rotations Ne* and a target torque Te* of the engine 18 from a predetermined engine high-efficiency map. The control device 50 calculates, from the target number of rotations Ne* of the engine 18, detected values of number of rotations Vm1 of the first MG 22, and the number of rotations Vm2 of the second MG 24, and the travel requested torque Tr*, and using a predetermined relationship equation, a target number of rotations Vm1* and a target torque Tr1* of the first MG 22 and a target torque Tr2* of the second MG 24. The target number of rotations Ne* and the target torque Te* of the engine 18, the target number of rotations Vm1* and the target torque Tr1* of the first MG 22, and the target torque Tr2* of the second MG 24 may be calculated from a map stored in a storage unit (not shown) based on the acceleration position AP or based on the acceleration position AP and the vehicle speed Vc.

The control device 50 outputs the target, number of rotations Ne* and the target torque Te* of the engine 18 which are calculated to the engine controller 52, and the engine controller 52 controls driving of the engine 18 with the control signal Si1 so that, the target number of rotations Ne* and the target torque Te* are obtained. In addition, the control device 50 outputs the target number of rotations Vm1* and the target torque Tr1* of the first MG 22 which are calculated, and the calculated target torque Tr2* of the second MG 24 to the MG controller 54, and the MG controller 54 controls the driving of the first MG 22 and the second MG 24 with the control signal Si2 so that the target number of rotations Vm1* and the target torques Tr1* and Tr2* are obtained.

With such a configuration, when the amount of operation of the acceleration pedal is small or when the vehicle speed Vc is low, the vehicle travels with only the second MG 24 serving as the drive source, with the engine 18 in a stopped state. In addition, the control device 50 drives the engine 18 to cause the first MG 22 to generate power and charge the generated power to the battery 26 when the SOC is lower than the reference SOC.

When the amount of operation of the acceleration pedal is large or when the vehicle speed Vc is high, the engine 18 is driven, and the vehicle travels with the engine 18 serving as the drive source. In this case, the control device 50 drives the second MG 24 along with, the engine 18 as necessary, and the vehicle travels with both the engine 18 and the second MG 24 serving as the drive source.

The hybrid electric vehicle 10 has, as travel modes, an HV mode and an EV mode. The "HV mode" is also known as a CS mode, and is a mode in which the vehicle travels with at least one of the engine 18 and the second MG 24 serving as the drive source. In the HV mode, during the travel of the vehicle, the driving of the engine 18 and the second MG 24, the power generation of the first MG 22 by engine driving, and execution and non-execution of the regenerative power generation of the second MG 24 during braking are switched and controlled, to maintain an SOC at an SOC of the current time (hereinafter referred to as "current SOC") or in a predetermined range centered around, the current SOC. For example, when the current SOC becomes lower than a lower limit of the predetermined range, the first MG 22 is caused to generate power by the driving of the engine 18, and the generated power is charged to the battery 28. On the contrary, when the current SOC becomes higher than an upper limit of the predetermined range, the engine 18 is stopped and the charged power of the battery 28 is consumed by the driving of the second MG 24.

The "EV mode," is also known as a CD mode, and is a mode in which the vehicle travels with only the second MG 24 serving as the drive source. In the EV mode, the SOC of the battery 28 is not maintained during the travel of the vehicle, and is actively consumed, by the second MG 24. In this case, the engine 18 is not driven. Even in the EV mode, when the amount of operation of the acceleration pedal is large or when the vehicle speed is high, the vehicle may travel also using the output of the engine 18, in order to secure a travel requested power of the vehicle. In this case also, the battery 23 is not charged by the driving of the engine 18.

The control device 50 selects the EV mode under a condition that a predetermined EV mode starting condition is satisfied, and controls the engine 18, the first MG 22, and the second MG 24 so that the vehicle travels in the EV mode, until the SOC becomes less than or equal to an "HV mode threshold" which is a value lower than an EV mode threshold. With such a configuration, after the EV mode is executed, the travel mode transitions to the HV mode in a state where the SOC is reduced to a value less than or equal to a predetermined value, as shown in "NOT CONTROLLED" in FIGS. 4, (B) and (C), to be described later. In addition, the "EV mode starting condition" may be set as a condition that the current SOC is greater than or equal to the "EV mode threshold" which is set in advance, the battery temperature is within a predetermined temperature range, and the electric power that can be output from the battery is greater than or equal to a predetermined value. The switching between the EV mode and the HV mode is not limited to the automatic execution by the vehicle, and alternatively, the mode may be manually switched by the driver operating an EV-HV switching switch (not shown).

The travel plan producer 56 produces, when the current SOC is greater than or equal to the EV mode threshold, a predetermined travel plan to switch between the HV mode and the EV mode based on map information including the current position, the destination, and the travel route to the destination acquired from the navigation device 32, and stores the travel plan in the storage unit. The "travel plan" is produced so that the "EV travel efficiency", which is a vehicle efficiency to be described later, becomes high. The mode switch controller 58 executes the switching control of the modes based on the travel plan.

Specifically, the travel plan producer 56 determines a plurality of continuous route elements in a travel route when the vehicle travels toward the destination, based on the acquired map information. The travel plan producer 56 produces a travel plan such that the EV travel efficiency calculated from a preset relationship becomes high among a plurality of route elements. In this case, the travel plan is produced with an emphasis on improving the EV travel efficiency in a future travel route.

Figure 2:
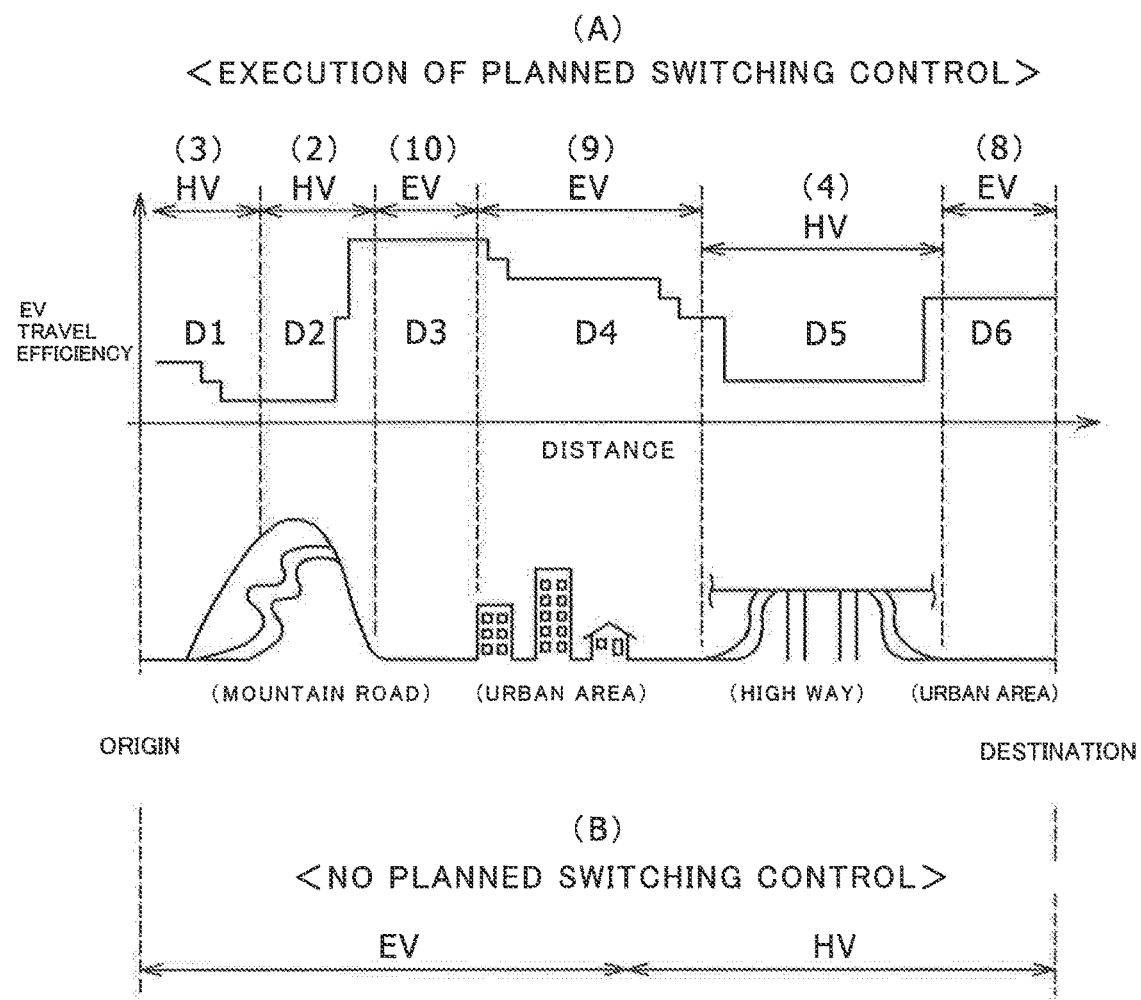
FIG. 2 is a diagram showing mode switching (A) when planned switching control which is switching control based on a travel plan is executed and (B) when the planned switching control is not executed.

This process will be described in detail with reference to FIG. 2. FIG. 2 shows mode switching in (A) a case where a planned switching control which is a switching control based on the travel plan is executed, and in (B) a case where the planed switching control is not executed. In FIG. 2, as an example configuration, the travel route from the origin to the destination is set passing through a mountain road, an urban area, and a highway. The travel route is divided into a plurality of continuous route elements D1, D2, . . . D6, according to a preset condition.

The control device 50 calculates and stores an expected average vehicle speed and an expected load applied to the vehicle during travel from the road inclination and the speed limit in each of travel elements D1, D2, . . . D6. The control device 50 calculates and stores the "EV travel efficiency" which is a vehicle efficiency corresponding to the energy efficiency when the vehicle travels in the EV mode in each of the route elements D1, D2, . . . D6. The "EV travel efficiency" is calculated by a predetermined relationship equation based on the expected average vehicle speed and the expected load. The EV travel efficiency becomes higher as the expected average vehicle speed becomes lower, and becomes lower as the expected average vehicle speed becomes higher. The EV travel efficiency becomes higher as the expected load becomes lower, and becomes lower as the expected load becomes higher.

The control device 50 stores in advance data of a map representing a relationship between the EV travel efficiency, the expected average vehicle speed, and the expected load, in the storage unit of the control device 50. The control device 50 calculates the expected average vehicle speed and the expected load in each of the plurality of the route elements D1, D2, . . . D6 from the map information acquired from the navigation device 32, and calculates the respective EV travel efficiency from the map data.

In (A) in FIG. 2, in each route element, scores are set which become higher when the EV travel efficiency is higher such as (3), (2), . . . . As shown in (A) in FIG. 2, in the mountain load where the load become high and in the highway where the vehicle speed becomes high, the EV travel efficiency is low, and thus the scores are low, such as (3), (2), and (4). On the other hand, in the urban area where the vehicle speed is low and the road inclination is small, the EV travel efficiency is high. Thus, the scores are high, such as (10), (9), and (8).

The travel plan producer 56 produces the travel plan so as to select one or a plurality of the route elements in the order of reducing efficiency from a route element (for example, D3) having the highest EV travel efficiency and the highest score, and to set the EV mode to the selected route elements (for example, D3, D4, and D6), and set the HV mode to the remaining route elements (for example, D1, D2, and D5). The travel plan is set such that, when the EV mode is executed over the entirety of the selected route elements (for example, D3, D4, and D6), the difference between the SOC remaining at the origin and the SOC of the HV mode threshold is fully used. Preferably, in the travel plan, the difference between the SOC remaining at the origin and the SOC of the HV mode threshold is fully used immediately before the destination.

The mode switch controller 58 executes the planned switching control, which is switching control between the HV mode and the EV mode in the travel route to the destination, based on the travel plan.

The switch control limiting unit 60 limits the execution of the planned switching control when in a predetermined state where the electric power that can be output from the battery 28 is limited. For example, the "predetermined state" is at least one of a "low-charge state" where the SOC is less than a predetermined lower limit remaining amount, a "low-temperature state" where the temperature of the battery 28 is less than a predetermined lower limit temperature, a "high-temperature state" where the temperature of the battery 28 is higher than a predetermined upper limit temperature, and a "low-output state" where an output upper limit electric power which is the power that can be output from the battery 28 is less than a predetermined lower limit electric power. For example, the "predetermined lower limit remaining amount" for the SOC is lower than the "EV mode threshold" described above which is a determination criterion for starting the EV mode.

For example, when the battery 28 is in the predetermined state, as the limitation of the planned, switching control, the switch control limiting unit 60 does not produce the plan itself and does not start the planned switching control, delays the execution of the mode to be switched, or, when the planned switching control is already started and is being executed, interrupts or suspends the control. When the planned switching control based on the map information is interrupted or suspended, the control device 50 may notify the driver of the interruption or the suspension by displaying on the display 35.

The "limitation" of the planned switching control is not limited to such a configuration where the interruption or suspension of the planned switching control is notified to the driver as described above to explicitly show execution or non-execution of the planned switching control to the driver, and may additionally include a configuration where, for example, the travel plan itself is changed, and the mode switching control is not executed according to the predetermined travel plan which was produced before the change.

FIG. 3 shows examples where the planned switching control is limited before starting of the planned switching control and during the execution of the planned switching control. In FIG. 3, when the battery state is such that the temperature of the battery 28 is inappropriate and low or high such that the "normal EV mode cannot, be executed", the travel plan is not produced before the start of the planned switching control, and the planned switching control is not started. In this case, the battery 28 is in the "low-temperature state" where the temperature of the battery 28 is less than the predetermined lower limit temperature or in the "high-temperature state" where the temperature of the battery 28 is higher than the predetermined upper limit temperature. The condition that the "normal EV mode cannot be executed" means that the starting condition for starting the EV mode when the planned switching control is not executed is not satisfied (this similarly applies in the following description).

When the temperature of the battery 28 is low or nigh such that the normal EV mode cannot be executed, during the execution of the planned switching control, the planned switching control is interrupted. In this case, the vehicle operates in a manner similar to the driving of the engine 18 during execution of the EV mode. The SOC quickly reaches the "HV mode threshold", and the travel transitions to the travel where the HV mode is continued. The "interruption" refers to an operation in which, when the battery 28 becomes not the predetermined state where the planned switching control is limited, the execution of the planned switching control can be resumed. In addition, because an internal resistance of the battery 28 varies according to the battery temperature, the "predetermined lower limit temperature", which is a determination criterion for whether or not the planned switching control is to be executed, is set from a temperature at which efficiency improvement of the system can be expected.

In addition, when the electric power Wout that can be output from the battery 28 is a low power where the normal EV mode cannot be executed also, similar to the case where the temperature of the battery 28 is inappropriate, the travel plan is not produced before the start of the planned switching control, or is interrupted during the execution of the planned switching control. In this case, the battery 28 is in the "low-power state" where the electric power which can be output from the battery 28 is less than the predetermined lower limit electric power. The electric power that can be output can be calculated from, the SOC, the detected value of the charging/discharging current, and the detected value of the battery voltage.

Moreover, when, the battery 28 is in a state where the SOC of the battery 28 is in a low charge state where the normal EV mode cannot be executed, the start of execution is prohibited before the start of the planned switching control, or the switching plan control is suspended and completed after transitioning into the HV mode in a case where the planned switching control is being executed. In this case, the battery 28 is in the "low-charge state" where the SOC of the battery 28 is less than the predetermined lower limit remaining amount. In this case, the mode switch controller 58 does not resume the planned switch control even when the SOC is recovered to a value greater than or equal to the predetermined lower limit remaining amount, and the planned switching control can be resumed only when the SOC becomes greater than or equal to the "EV mode threshold" and the vehicle is not in the state of limiting the planned switching control of FIG. 3 including the state of the battery.

Figure 4:
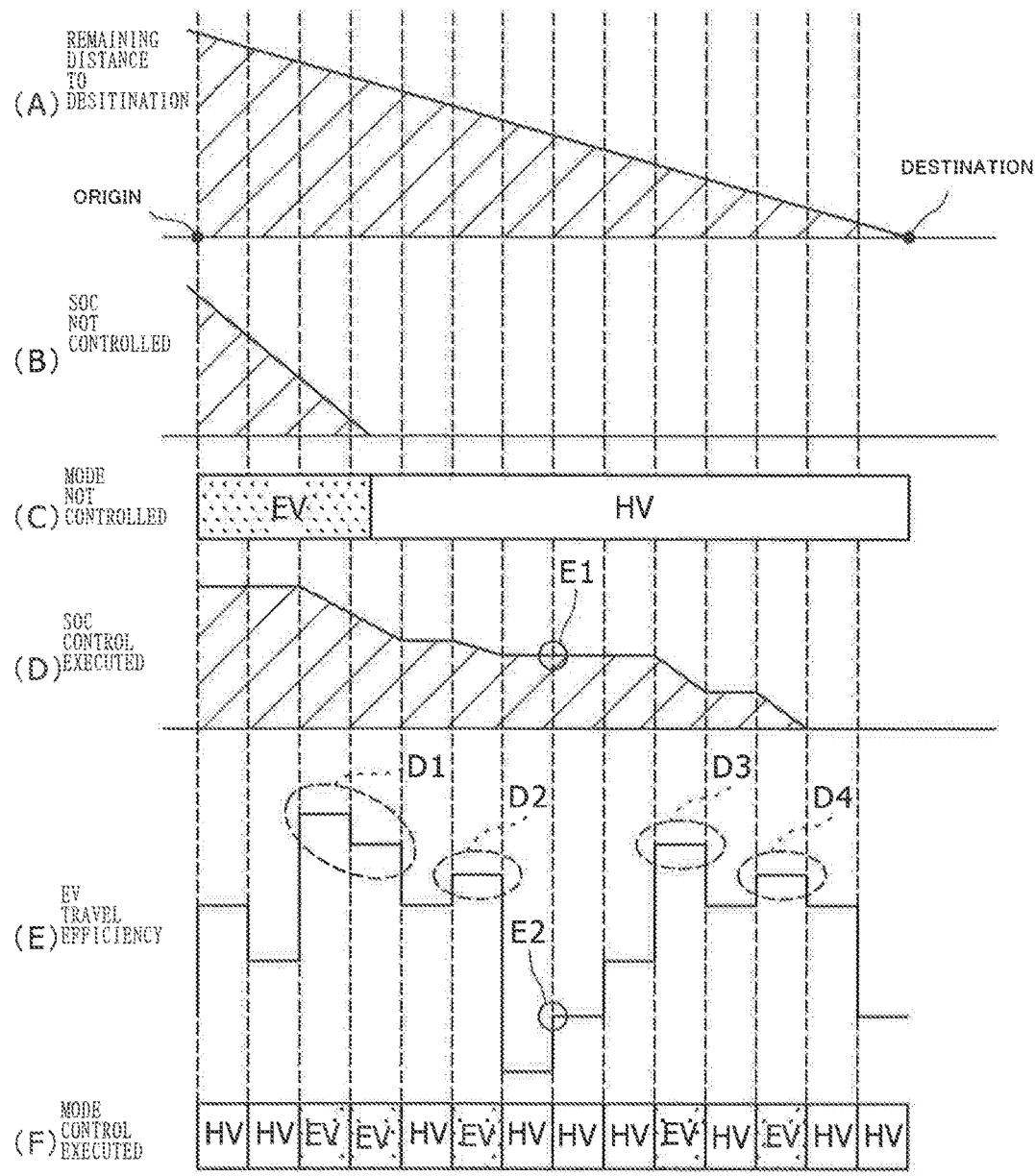
FIG. 4 is a diagram showing, in the vehicle of FIG. 1, (A) a remaining distance from an origin to a destination, (B) an SOC which is a remaining amount of charge and (C) a travel mode when the planned switching control is not executed, (D) an SOC when the planned switching control is executed, (E) an EV travel efficiency, and (F) a travel mode when the planned switching control is executed.

FIG. 4 shows (A) a remaining distance from the origin to the destination, (B) the SOC and (C) travel mode when the planned switching control is not executed, (D) the SOC when the planned switching control is executed, (E) the EV travel efficiency, and (F) the travel mode when the planned switching control is executed. As shown in FIG. 4, when the travel route from the origin to the destination is set, the SOC satisfies the predetermined EV mode start condition at the destination origin, and the planned switching control is not executed, as shown in (B) and (C), after the EV mode is started, the mode transitions to the HV mode in a state where the SOC is reduced to a value less than or equal to the predetermined EV mode threshold.

On the other hand, the control device 50 produces the travel plan to switch the mode as shown in (F) based on the EV travel efficiency shown in (E). In this case, a route element corresponding to a portion surrounded by broken lines D1, D2, D3, and D4 in (E) is selected as a portion of a high EV travel efficiency, the EV mode is set for this portion, and the HV mode is set for the remaining route elements.

The control device 50 executes the planned switching control based on the travel plan. In this case, as shown in (D), when the vehicle travels toward the destination, the SOC is maintained approximately constant in the HV mode, the SOC is gradually reduced in the EV mode, and these states are repeated, until the destination is reached. In this case, with the SOC remaining at the origin, the SOC to the HV mode threshold can be fully used immediately before the destination. Because of this, the fuel consumption performance of the vehicle is improved.

Figure 5:
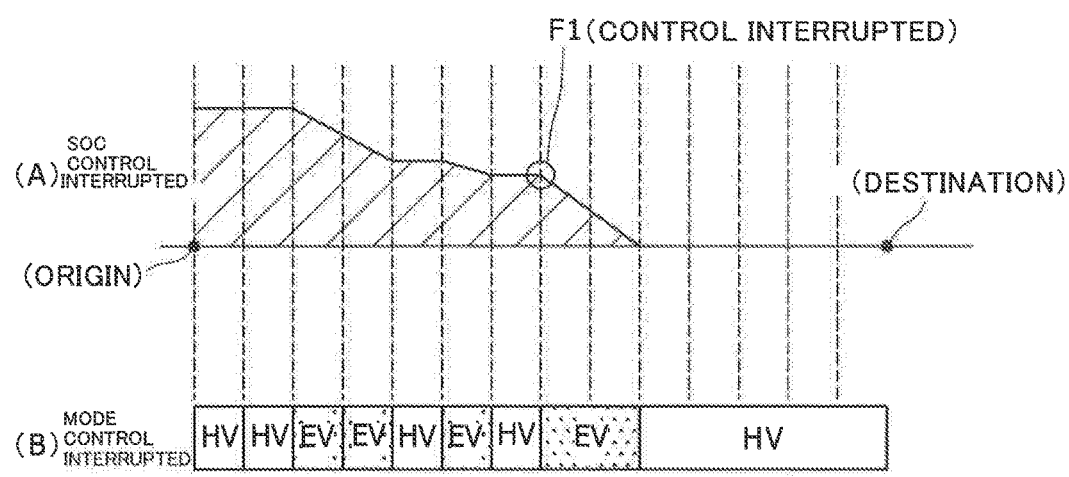
FIG. 5 is a diagram showing, in the case corresponding to (D) in FIG. 4, (A) an SOC and (B) a travel mode when the planned switching control is interrupted.

On the other hand, when the predetermined state in which the planned switching control is to be limited, such as when the battery temperature is less than a predetermined lower limit temperature during the execution of the planned switching control, as explained with reference to FIG. 3, is satisfied, the planned, switching control is limited by the switch control limiting unit 60. FIG. 5 shows (A) the SOC and (B) the travel mode when the planned switching control is interrupted in a case corresponding to (D) of FIG. 4. When the predetermined state in which the planned switching control is to be limited is satisfied at points corresponding to E1 and E2 of FIGS. 4, (D) and (E), for example, when the battery temperature is less than the predetermined lower limit temperature, the planned switching control is interrupted corresponding to F1 of FIG. 5(A), In this case, the mode is switched from the HV mode to the EV mode, and, after the SOC is reduced to a value less than or equal to the EV mode threshold, the mode transitions to the continuous state of the HV mode until reaching the destination. Although not shown in the figures, the planned switching control may be delayed. For example, during the execution of the EV mode, the mode may be switched to the HV mode for recovering the SOC and, in a state where the SOC is recovered to a value greater than or equal to the EV mode threshold, the travel plan may be re-produced based on the EV travel efficiency in the future travel route, and the planned switching control may be executed based on the re-produced travel plan.

As described, the control device 50 determines, when the predetermined, lower limit remaining amount of the SOC, the predetermined lower limit temperature of the battery temperature, or the predetermined lower limit electric power of the electric power that can be output, is taken as a first threshold, whether or not the planned switching control based on the map information is to be executed based on whether or not a preset state of the battery 28 is greater than or equal to the first threshold. In this manner, when the battery 28 is in the predetermined state where the electric power that, can be output from the battery 28 is limited, the execution of the planned switching control is limited, and thus, the execution of the planned switching control can be limited when the control is not appropriate. Because of this, it becomes not necessary to frequently repeat starting and stopping of the engine 18 in order to satisfy the strict condition in the execution of the planned switching control. Therefore, with the inhibition of such repetition, the drivability, the fuel consumption performance, and the endurance of the battery 28 can be improved.

In FIG. 3, as examples of limitations of the execution of the planned switching control, examples of the "switch", the "mode", and the "others" are also shown. For example, before the execution of the planned switching control is started, if at least any one of an EV-HV switching switch, an EV urban area switch, and an SOC recovery switch (all of which are not shown in the figures) is switched ON, the planned switching control is not started. Moreover, in the same situation, but during the execution of the planned switching control, the planned switching control is interrupted. With such a configuration, it is possible to prioritize the intent of the driver based on the switch operation. The "EV urban area switch" is a switch for instructing execution of the EV mode for traveling in the urban area. The "SOC recovery switch" is a switch for instructing execution of the HV mode to increase the SOC.

When the vehicle transitions to the HV mode in a state where the planned switching control is not executed, the execution of the planned switching control is not started. In this case, the planned switching control is executed when the SOC is increased in the HV mode for increasing the SOC such that the SOC becomes greater than or equal to the EV mode threshold, the destination is set in the navigation device, and the distance to the destination is greater than or equal to a predetermined value.

When the control device 50 detects a failure of the vehicle using an input of a detected value from a sensor that detects failure of the vehicle, the planned switching control is not started, before the execution of the planned switching control is started, or the planned switching control is interrupted if the control is being executed.

Next, a case will be described in which, in the embodiment, at least one of a regeneration amount enlarging control which is another control and a charge target changing control which is yet another control, is combined with the embodiment. In this case, with reference to FIG. 1, the control device has a regeneration amount enlargement controller 62 and a charge target changing controller 64. Alternatively, the control device 50 may only have one of the regeneration amount enlargement controller 62 and the charge target changing controller 64.

First, the regeneration amount enlargement controller 62 will be described. The regeneration amount enlargement controller 62 acquires, from the navigation device 32, map information including the current position and a target stop position. The regeneration, amount enlargement controller 62 predicts or sets a target stop position and a deceleration starting point which are positions of stopping and decelerating by the operation of the driver in the travel route, and controls the regenerative power generation of the second MG 24 until the target stop position, to execute a regeneration amount enlarging control to enlarge the regenerative power generation amount which can be charged in the battery 28.

Figure 6:
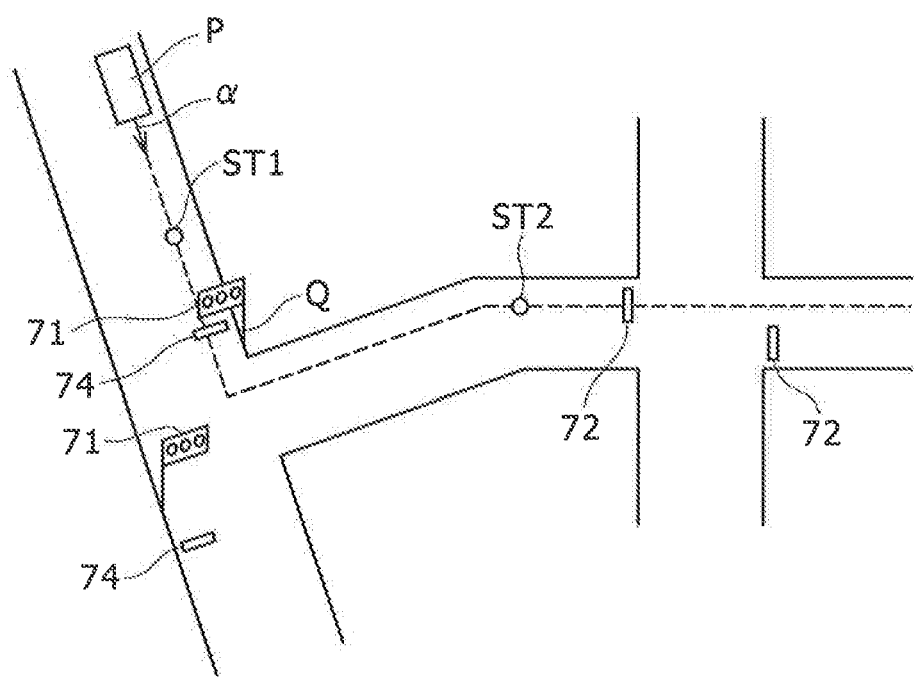
FIG. 6 is a diagram showing a relationship between a target stop position on a travel route stored in the navigation device of FIG. 1 and a deceleration start position.

FIG. 6 shows a relationship between a target stop position on the travel route and the deceleration start position, stored in the navigation device 32. In FIG. 6, in the map information stored in the navigation device 32, the travel, route is set as shown by a broken line, and a signal light 71 and a temporary stop position 72 are set on the travel route. In this case, when the current position of the hybrid electric vehicle 10 is P and the vehicle travels in the direction of an arrow α for example, a stop line 74 immediately before the signal light 71 at a Q position closest to the current position is set as the target stop position.

The navigation device 32 may have a learning function to store a particular stop position including the temporary stop position where vehicles stop more frequently than a certain frequency, and may set the particular stop position as the target stop position when the particular stop position exists in front of the current position. The control device 50 acquires information including the target stop position and the current position from the navigation device 32.

The regeneration amount enlargement controller 62 sets a deceleration start position (ST1) for increasing the regenerative power generation amount by the second MG 24 that can be recovered by the battery 28 until the predicted target stop position using a preset relationship equation, or map and based on the acquired target stop position, the acquired current position, and the detected vehicle speed. In addition, the regeneration amount enlargement controller 62 calculates a deceleration setting point td which is the time when the regenerative power generation is increased from the deceleration start position, and the regenerative torque corresponding to the regenerative power generation to be increased from the deceleration setting point td. The regeneration amount enlargement controller 62 applies control to increase the regenerative power generation of the second MG 24 based on the calculated deceleration setting point td and the calculated regenerative torque, and when the driver sets the acceleration pedal to the non-operated state, that is, when the driver switches acceleration OFF. In this case, the regeneration amount enlargement controller 62 controls the second inverter. Alternatively, the deceleration setting point td and the deceleration start position may be estimated by the navigation device 32 in place of the calculation by the control device 50, and transmitted to the control device 50.

Figure 7:
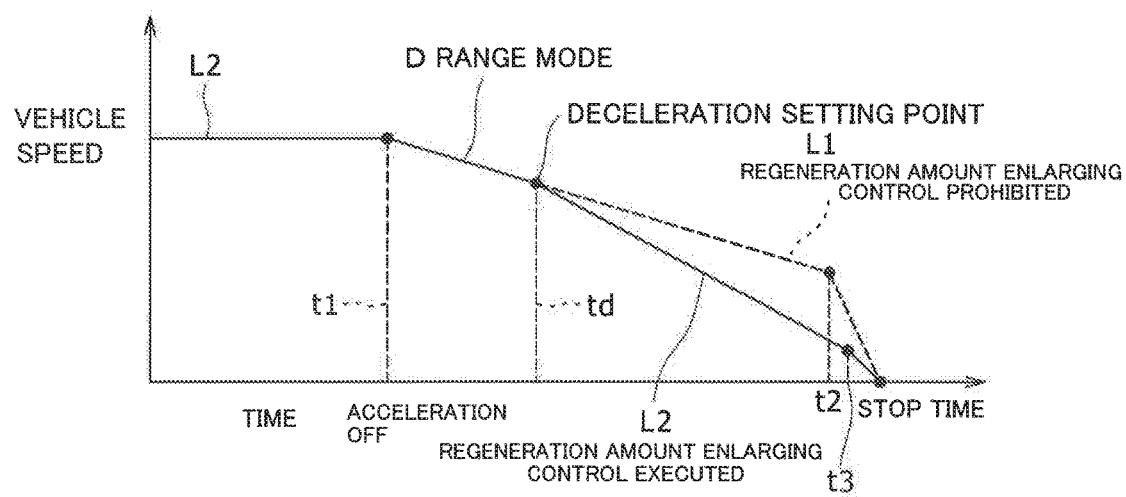
FIG. 7 is a diagram showing a state of reduction of a vehicle speed as time elapses, in a comparison between execution and prohibition of regeneration amount enlarging control in the case where the vehicle is to be stopped at a target stop position.

FIG. 7 shows a state where the vehicle speed is reduced as time elapses, in a comparison between permission and prohibition of the regeneration amount enlargement control when the hybrid electric vehicle 10 is to be stopped at the target stop position. In FIG. 7, a broken line L1 shows a case where the vehicle travels in the D range mode, and a deceleration state when the regeneration amount enlargement control is not executed. The broken line L1 matches a case of execution of the regeneration amount enlargement control before the deceleration setting point td shown with a solid line L2. In this case, after the driver sets the acceleration OFF at time t1, the driver steps on the brake pedal at time t2 and the hybrid electric vehicle 10 is stopped at a stopping time corresponding to the target stop position.

When the regeneration amount enlargement control is not executed, as in the broken line L1, for example, when the brake pedal is stepped on at time t2 between time td and time t3, because the vehicle speed at the time of step-on is high, the degree of deceleration from t2 to the stopping time becomes large. The regenerative power generation amount of the second MG 24 becomes larger as the degree of deceleration, which is the degree of reduction of the vehicle speed per predetermined time period, is increased, but there is an allowance upper limit for the charging rate which is the rate of supply of electric power to the battery 28. Because of this, when the degree of deceleration exceeds a predetermined value corresponding to the allowance upper limit, wasteful generated power which is not charged to the battery 28 is caused, and thus, there is room for improvement from the viewpoint of improvement of the fuel consumption performance.

The solid line L2 of FIG. 7 shows a case where the regeneration amount enlargement control is executed on the broken line L1. In this case, the regeneration amount enlargement controller 62 controls the regenerative power generation by controlling the second inverter, so that the regenerative torque of the second MG 24 is increased after the deceleration setting point td, to increase the degree of deceleration. In this case, the braking torque corresponding to the engine brake acting in a direction to decelerate the hybrid electric vehicle 10 becomes large. Because of this, as the degree of deceleration becomes large at a relatively early stage, the vehicle speed is relatively gradually reduced. Thus, it becomes not necessary for the driver to strongly step on the brake pedal at the time t3 even immediately before the stopping, and the speed of the hybrid electric vehicle 10 is not rapidly reduced. Because of this, the regenerative power generation amount which can be charged to the battery 28 can be enlarged based on the map information, and the fuel consumption performance can be improved.

The regeneration amount enlargement controller 62 sets the deceleration setting point td such that an estimated value of the degree of deceleration when the brake pedal is stepped on is a predetermined value smaller than the degree of deceleration corresponding to the allowance upper limit of the charge speed of the battery 28. In the execution of such a regeneration amount enlarging control, in order to avoid deceleration not intended by the driver, a condition must be set such that the driver sets the acceleration OFF. In addition, the magnitude of such a degree of deceleration and the deceleration setting point td differs according to the vehicle speed. For example, it is necessary to set the deceleration setting point td to a position closer to the current position as the vehicle speed is increased. For these reasons, the regeneration amount enlargement controller 62 calculates the deceleration setting point td based on the detected vehicle speed, the current position and the target stop position, calculates the regenerative torque corresponding to the regenerative power generation to be increased from the deceleration setting point td, and controls the regenerative power generation of the second MG 24.

On the other hand, the control device 50 determines whether or not to execute the planned switching control based on the map information, based on whether or not a preset state of the battery 28 is greater than or equal to the first threshold. For example, the control device 50 determines that the planned switching control is to be executed when the battery temperature is greater than or equal to a predetermined lower limit temperature which is the first threshold, when the SOC is greater than or equal to a predetermined lower limit remaining amount which is the first threshold, or when the electric power that can be output from the battery 28 is greater than or equal to a predetermined lower limit electric power which is the first threshold.

On the contrary, the control device 50 determines that the planned switching control is to be prohibited when the battery temperature is less than the predetermined lower limit temperature, the SOC is less than the predetermined lower limit remaining amount, or the electric power that can be output, is less than the predetermined lower limit electric power.

In this case, the control device 50 determines whether or not the regeneration amount enlarging control based on the map information is to be executed based on whether a preset condition of the battery 28, for example, the SOC of the battery 28, the battery temperature, or the electric power that can be output is greater than or equal to a second threshold that is different from the first threshold. For example, the control device 50 determines that the regeneration amount enlarging control is to be executed when the battery temperature is greater than or equal to a second predetermined, lower limit temperature which is the second threshold and which differs from the predetermined lower limit temperature, when the SOC is greater than or equal to a second predetermined lower limit remaining amount which is the second threshold and which differs from the predetermined lower limit remaining amount, or when the electric power that can be output from the battery 28 is greater than or equal to a second predetermined lower limit electric power which is the second threshold and which differs front the predetermined lower limit electric power. On the contrary, the control device 50 determines that the regeneration amount enlarging control is to be prohibited when the battery temperature is less than the second predetermined lower limit temperature, when the SOC is less than the second predetermined lower limit remaining amount, or when the electric power that can be output is less than the second predetermined lower limit electric power.

According to such a configuration, in each of the regeneration amount enlarging control and the planed switching control based on the map information, the execution permission condition of the control is set in consideration of the state of the battery 28. Therefore, the timing of execution of the control based on the map information can be optimized, and excessive prohibition of the control can be prevented.

Alternatively, the predetermined lower limit temperature corresponding to the battery temperature may be set larger than the second predetermined lower limit temperature, the predetermined lower limit remaining amount corresponding to the SOC may be set larger than the second predetermined lower limit remaining amount, and the predetermined lower limit electric power corresponding to the electric power that can be output may be set larger than the second predetermined lower limit electric power.

In this case, because the execution condition of the planned switching control based on the map information is stricter than the execution condition of the regeneration amount enlarging control, the timing of execution of the control based on the map information can be optimized to an even greater degree.

Next, the charge target changing controller 64 (FIG. 1) will be described. The charge target changing controller 64 acquires map information including a current position and a particular downhill road position having an inclination which is greater than or equal to a predetermined value, from the navigation device 32. The charge target changing controller 64 executes charge target changing control to change a control target value of the SOC of the battery 28 based on the information of the particular downhill road position in the travel route.

Figure 8:
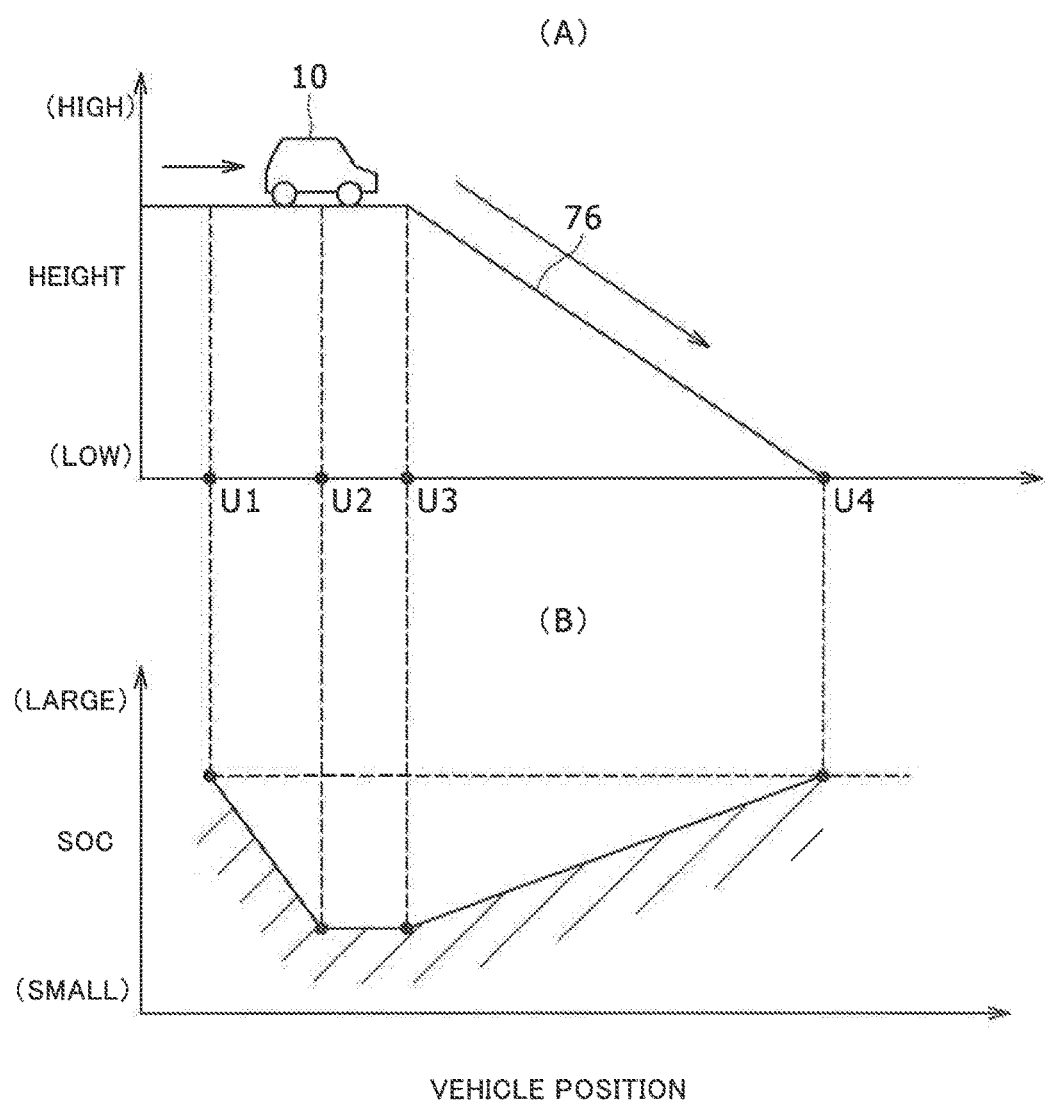
FIG. 8 is a diagram showing a relationship between a particular downhill road and a vehicle position when charge target changing control is executed and an SOC corresponding to the vehicle position.

FIG. 8 shows a relationship between a particular downhill road 76 and the vehicle position on the travel route and the SOC corresponding to the vehicle position when the charge target changing control is executed. When the vehicle proceeds in the direction of the arrow and moves down the particular downhill road 76, the SOC is rapidly increased due to the regenerative power generation of the second MG 24 by the setting of the acceleration OFF. On the other hand, when the SOC is sufficiently high when the hybrid electric vehicle 10 is positioned before the particular downhill road 76, it may not be possible to sufficiently recover the generated power obtained by the traveling on the particular downhill road 76 by the battery 28, and the generated power may be wasted.

The charge target changing controller 64 executes control such that when it is determined that the hybrid electric vehicle 10 is within a predetermined distance before the particular downhill road 76 based on the acquired current position and the acquired position of the particular downhill road 76, EV travel is executed to actively drive the second MG 24 so that the reference SOC, which is a control target value of the SOC, is reduced to a value less than or equal to a predetermined value. With such a configuration, it is possible to sufficiently reduce the SOC from a U1 position to a U2 position of the vehicle, and the electric power obtained by the regenerative power generation from a U3 position, which is a starting position of the particular downhill road 76, to a U4 position which is a completion position, can be sufficiently recovered by the battery 23. Because of this, efficient travel can be realized.

Alternatively, the control device 50 may have a structure in which infrastructure information, including congestion information having a congestion position, is acquired from the navigation device 32, and control is executed to reduce the reference SOC to a value less than or equal to a predetermined value similar to the case of the particular downhill road 76 when the hybrid electric vehicle 10 is within a predetermined distance before the congestion position. In this case also, because the vehicle is decelerated at the congestion position, the electric power obtained by the regenerative power generation can be sufficiently recovered by the battery 28.

When a configuration is employed in which the control device 50 determines whether or not the planned switching control based on the map information is to be executed by determining whether or not a preset state of the battery 28 is greater than or equal to the first threshold as described above, a structure may be employed in which the control device 50 determines whether or not the charge amount changing control is to be executed by determining whether or not the preset state of the battery 28 is greater than or equal to a second threshold different from the first threshold. In this case, the preset state of the battery 28 is, for example, the SOC, the battery temperature, or the electric power that can be output, of the battery 28.

For example, the control device 50 determines that the charge amount changing control is to be executed when the battery temperature is greater than or equal to a second predetermined lower limit temperature which is the second threshold and which differs from the predetermined lower limit temperature, when the SOC is greater than or equal to a second predetermined lower limit remaining amount which is the second threshold and which differs from the predetermined lower limit remaining amount, or when the electric power that can be output from the battery 28 is greater than or equal to a second predetermined lower limit electric power which is the second threshold and which differs from the predetermined lower limit electric power. On the contrary, the control device 50 determines that the charge amount changing control is to be prohibited when the battery temperature is less than the second predetermined lower limit temperature, when the SOC is less than the second predetermined lower limit remaining amount, or when the electric power that can be output is less than the second predetermined lower limit electric power.

According to such a configuration, in each of the charge amount changing control and the planned switching control based on the map information, an execution permission condition of the control can be set in consideration of the state of the battery 28. Thus, the time when the control based on the map information is executed can be optimized, and excessive prohibition can be prevented.

In addition, in this case also, similar to the cases where the regeneration amount enlarging control and the planned switching control are executed, the predetermined lower limit temperature corresponding to the battery temperature may be set larger than the second predetermined lower limit temperature, the predetermined lower limit remaining amount corresponding to the SOC may be set larger than the second predetermined lower limit remaining amount, and the predetermined lower limit electric power corresponding to the electric power that can be output may be set larger than the second predetermined lower limit electric power.

In this case, because the execution condition of the planned switching control based on the map information is stricter than the execution condition of the charge amount changing control, the time of the execution of the control based on the map information can be optimized to an even greater degree.

Alternatively, the control device 50 may have a structure in which, when execution of one of the regenerative power generation enlarging control and the charge target changing control based on the map information, and the execution of the planned switching control, are permitted based on the preset state of the battery 28, the execution of the planned switching control is permitted and one of the regenerative power generation enlarging control and the charge target changing control is prohibited.

Figure 9:
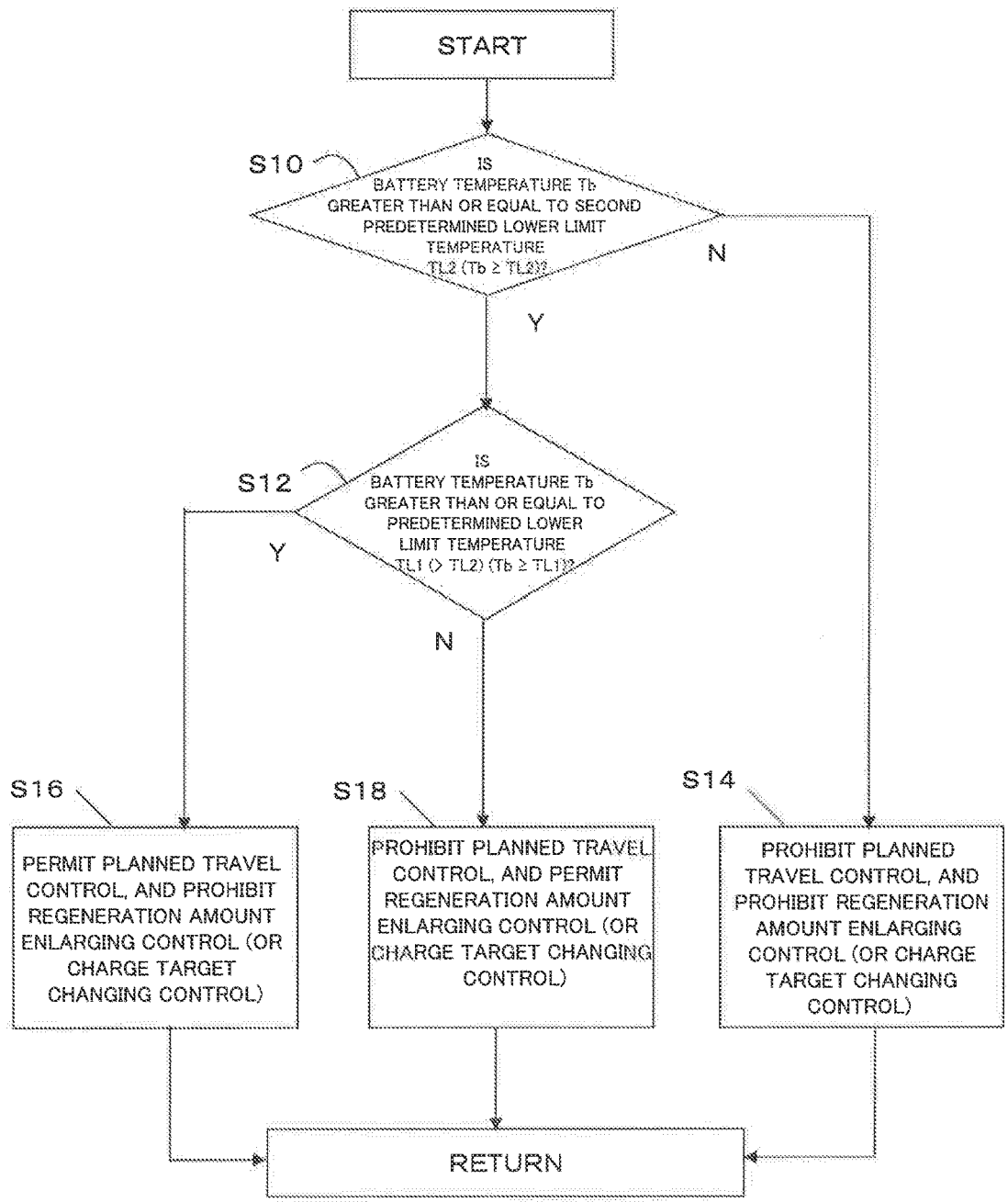
FIG. 9 is a flowchart showing a method of determining whether or not the planned, switching control and regeneration amount enlarging control (or charge target changing control) are to be executed in the vehicle of FIG. 1.

FIG. 9 is a flowchart showing a method of determining whether or not the planned switching control and the regenerative amount enlarging control for charge target changing control) are to be executed.

The control device 50 can execute the method shown in the flowchart of FIG. 9 by a program stored in the storage unit in advance. In FIG. 9, a case is described in which execution of the control is determined based on the temperature condition of the battery 28, but the method is similar in the case where the execution of the control is determined based on the SOC or the electric power that can be output. In the following, the regeneration amount enlarging control (or charge target changing control) will be simply referred to as the regeneration amount enlarging control.

In S10, it is determined whether or not the battery temperature Tb is greater than or equal to a second predetermined lower limit temperature TL2 which is a determination criterion for execution of the regeneration amount enlarging control. The second predetermined lower limit temperature TL2 is smaller than a predetermined lower limit temperature TL1, which is a determination criterion for the execution of the planned switching control (TL2>TL1).

When the execution of the regeneration amount enlarging control is determined, the predetermined lower limit temperature TL1 can be set based on the electric power that can be output from the battery 28 to enable intermittent drive travel in which engine driving and stopping are repeated during congestion, or the SOC for enabling sufficient recovery, by the battery 28, of the electric power by the regenerative power generation during downhill movement of a preset downhill road.

Similarly, when the execution of the charge target changing control is determined, the predetermined lower limit temperature TL1 may be set from the battery temperature for enabling sufficient recovery, by the battery 28, of the electric power by the regenerative power generation even when the regenerative power generation during regenerative braking is enlarged, or from the battery temperature to prevent an excessive increase of the braking force at the setting of the acceleration OFF, called blown-up.

When the determination result of S10 is negative, execution of both the planned travel control and the regeneration amount enlarging control are prohibited in S14.

Figure 10:
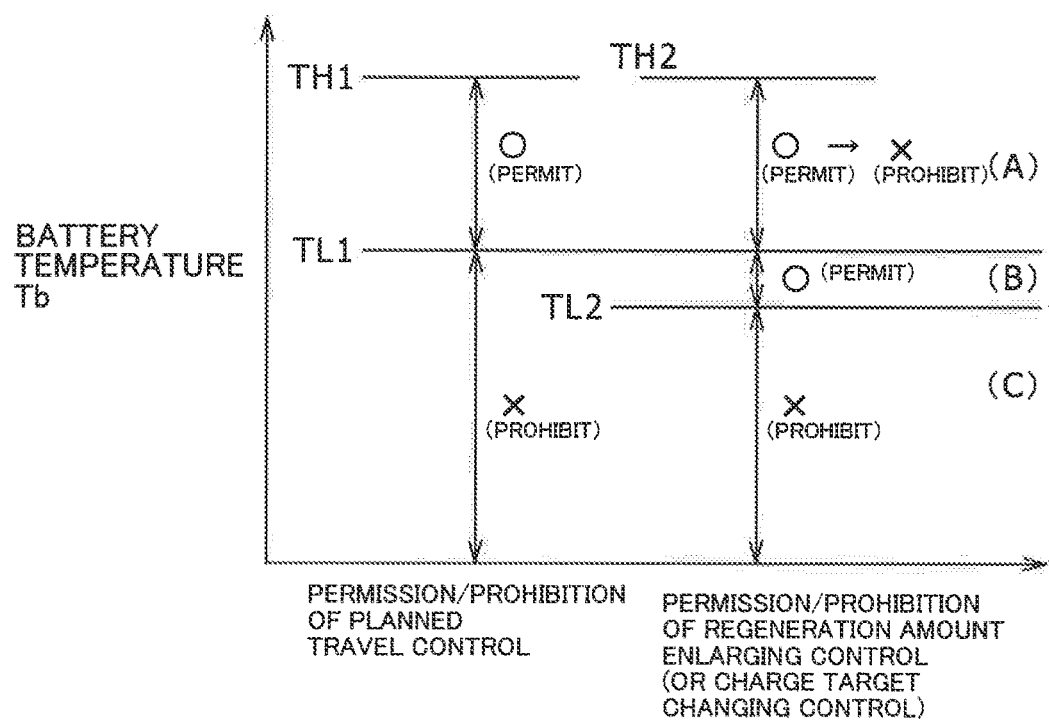
FIG. 10 is a diagram showing a relationship between a battery temperature Tb and determination of whether or not the planned switching control and the regeneration amount enlarging control (or charge target changing control) are to be executed, corresponding to FIG. 9.

FIG. 10 shows a relationship between the battery temperature Tb and the permission/prohibition of execution of the planned switching control and the regeneration amount enlarging control, corresponding to FIG. 9. In FIG. 10, a circle (o) indicates permission of execution and an X indicates prohibition of the execution. As shown in (C) of FIG. 10, when the battery temperature Tb is less than TL2, execution of both the planned travel control and the regeneration amount enlarging control are prohibited, corresponding to S14 of FIG. 9.

When the determination result of S10 of FIG. 3 is positive, it is determined whether or not the battery temperature Tb is greater than or equal to the predetermined lower limit temperature TL1 (S12), and, when the determination result thereof is positive, the execution of the planned travel control is permitted, but the execution of the regeneration amount enlarging control is prohibited in S16. This case corresponds to the case shown in (A) in FIG. 10.

On the other hand, when the determination result in S12 is negative, the execution of the planned travel control is prohibited, but the execution of the recovery amount, enlarging control is permitted in S18. This case corresponds to the case shown in (B) in FIG. 10.

According to such a configuration, when the execution of one of the regeneration power generation enlarging control and the charge target changing control conflicts with the execution of the planned switching control based on the preset state of the battery 28, it is possible to prioritize the execution of the planned switching control.

A preferred embodiment of the present invention has been described. However, the present invention is not limited to the preferred embodiment described herein, and the present invention may be practiced in various forms within a range that does not deviate from the scope of the present invention. For example, a configuration may be employed in which the navigation device 32 receives infrastructure information including a signal light position and red light information of the signal light, and the control device 50 acquires the red light information of the signal light in front of the vehicle from the infrastructure information. In this case, when at least one of the regeneration power generation enlarging control and the charge target changing control is executed, a position deduced as a position immediately before the signal light may be calculated as a target stop position, and the deceleration control may be executed using the distance to the target stop position and detected value of the vehicle speed, or the reference SOC may be reduced before the target stop position.

EXPLANATION OF REFERENCE NUMERALS

10 HYBRID ELECTRIC VEHICLE; 12 CONTROL SYSTEM; 14 MOTIVE POWER TRANSMITTING MECHANISM; 16 WHEEL; 18 ENGINE; 22 FIRST MOTOR GENERATOR (FIRST MG); 24 SECOND MOTOR GENERATOR (SECOND MG); 26 INVERTER UNIT; 28 BATTERY; 30, 30A TRANSMISSION LEVER; 32 NAVIGATION DEVICE; 34 MOTIVE POWER DIVIDING MECHANISM; 35 DISPLAY; 36 OUTPUT SHAFT; 38 GEAR-REDUCER; 40 AXLE; 41 ACCELERATION POSITION SENSOR; 42 WHEEL SPEED SENSOR; 50 CONTROL DEVICE; 52 ENGINE CONTROLLER; 54 MG CONTROLLER; 56 TRAVEL PLAN PRODUCER; 58 MODE SWITCH CONTROLLER; 60 SWITCH CONTROL LIMITING UNIT; 62 REGENERATION AMOUNT ENLARGEMENT CONTROLLER; 64 CHARGE TARGET CHANGING CONTROLLER; 71 SIGNAL LIGHT; 72 TEMPORARY STOP POSITION; 74 STOP LINE; 76 PARTICULAR DOWNHILL ROAD; 80 TEMPERATURE SENSOR; 82 ELECTRIC POWER CONVERSION DEVICE; 84 EXTERNAL POWER SUPPLY; 86 CABLE; 88, 90 CONNECTOR.

The invention claimed is:

1. A hybrid electric vehicle having a switching control function of travel modes based on map information, that has an HV mode as a hybrid vehicle mode and an EV mode as an electric car mode, and that produces a predetermined travel plan to switch between the HV mode and the EV mode based on the map information, comprising:
a control device configured to execute a switching control of the HV mode and the EV mode based on the travel plan,
wherein the travel plan is produced so that the EV mode is executed in a route element in which a travel efficiency is a predetermined value or higher, and so that the HV mode is executed in a route element in which the travel efficiency is less than the predetermined value, the travel efficiency being obtained when a vehicle travels in the EV mode in each route element of a travel route having a plurality of route elements, the travel efficiency becoming lower in a route element in which both of expected load and expected average vehicle speed are higher, and the travel efficiency becoming higher in a route element in which both of the expected load and the expected average vehicle speed are lower,
wherein the control device limits execution of the switching control of the HV and EV modes based on the travel plan when the hybrid electric vehicle is in a predetermined state in which an electric power that can be output from an electricity storage unit connected to a rotary electric machine driven during execution of the EV mode is limited,
wherein the control device executes a control operation for changing a target value of a current charge capacity of the electricity storage unit based on a downhill road position of the map information, and
wherein the control device determines whether or not to execute the switching control based on the travel plan by determining whether or not a quantity relating to a charge remaining amount, a temperature, or an electric power that can be output, of the electricity storage unit corresponding to the predetermined state is greater than or equal to a first threshold, and
wherein the control device determines whether or not to execute the control operation for changing the target value of the current charge capacity of the electricity storage unit based on the map information by determining whether or not the quantity is greater than or equal to a second threshold, wherein the first threshold and the second threshold differ from each other.

2. The hybrid electric vehicle according to claim 1, wherein
the predetermined state in which the electric power that can be output from the electricity storage unit is limited is one of the following states: a low-charge state in which a charge remaining amount of the electricity storage unit is less than a predetermined lower limit remaining amount, a low-temperature state in which the temperature of the electricity storage unit is less than a predetermined lower limit temperature, and a low-power state in which the electric power that can be output from the electricity storage unit is less than a predetermined lower limit electric power.

3. A hybrid electric vehicle having a switching control function of travel modes based on map information, that has an HV mode as a hybrid vehicle mode and an EV mode as an electric car mode, and that produces a predetermined travel plan to switch between the HV mode and the EV mode based on the map information, comprising:
a control device configured to execute a switching control of modes of the HV mode and the EV mode based on the travel plan,
wherein the travel plan is produced so that the EV mode is executed in a route element in which a travel efficiency is a predetermined value or higher, and so that the HV mode is executed in a route element in which the travel efficiency is less than the predetermined value, the travel efficiency being obtained when a vehicle travels in the EV mode in each route element of a travel route having a plurality of route elements, the travel efficiency becoming lower in a route element in which both of expected load and expected average vehicle speed are higher, and becoming higher in a route element in which both of the expected load and the expected average vehicle speed are lower,
wherein the control device limits execution of the switching control of the HV and EV modes based on the travel plan when the hybrid electric vehicle is in a predetermined state in which an electric power that can be output from an electricity storage unit connected to a rotary electric machine driven during execution of the EV mode is limited,
wherein the control device executes a control operation for at least one control of enlarging an amount of regenerative power generation that can be charged in the electricity storage unit by controlling regenerative power generation of the rotary electric machine by predicting or setting stopping and deceleration by a driver based on the map information, wherein the control operation includes at least one operation for, based on the map information and a detected vehicle speed, controlling to set a deceleration start position for increasing the amount of regenerative power generation, and a deceleration setting point which is passed after the deceleration start position based on the map information and a detected vehicle speed, upon detection of release of an acceleration pedal by the driver, generating a first regenerative torque in the rotary electric machine from the deceleration start position to the deceleration setting point to decelerate the vehicle, and generating a second regenerative torque greater than the first regenerative torque in the rotary electric machine after the deceleration setting point to increase a degree of deceleration, and changing a target value of a current charge capacity of the electricity storage unit based on the map information, wherein the control device determines whether or not to execute the switching control based on the travel plan by determining whether or not a quantity relating to the charge remaining amount, the temperature, or the electric power that can be output of the electricity storage unit, is greater than or equal to a first threshold, and wherein the control device determines whether or not to execute the control operation for enlarging the amount of regenerative power generation that can be charged in the electricity storage unit based on the map information and for changing the target value of the current charge capacity of the electricity storage unit based on the map information by determining whether or not the quantity is greater than or equal to a second threshold, wherein the first threshold and the second threshold differ from each other.

4. The hybrid electric vehicle according to claim 1, wherein
the control device, when execution of the control operation for changing the target value of the current charge capacity of the electricity storage unit based on the map information, and execution of the switching control based on the travel plan are to be permitted based on the quantity, permits the execution of the switching control based on the travel plan and prohibits the execution of the control operation for changing the target value of the current charge capacity of the electricity storage unit based on the map information.

5. The hybrid electric vehicle according to claim 1, wherein
an external charging from an external power supply to the electricity storage unit is enabled in a travel stop state.

6. The hybrid electric vehicle according to claim 3, wherein the control device, when execution of the control operation for at least one control of enlarging the amount of regenerative power generation that can be charged in the electricity storage unit based on the map information and for changing the target value of the current charge capacity of the electricity storage unit based on the map information, and execution of the switching control of the HV and EV modes based on the travel plan, are to be permitted based on the quantity, permits the execution of the switching control of the HV and EV modes based on the travel plan and prohibits the execution of the control operation.

7. The hybrid electric vehicle according to claim 3, wherein an external charging from an external power supply to the electricity storage unit is enabled in a travel stop state.

* * * * *